United States Patent [19]

Hoashi

[11] Patent Number: 4,859,165
[45] Date of Patent: Aug. 22, 1989

[54] EXTRUDER FOR FOOD

[75] Inventor: Chikako Hoashi, Musashinoshi, Japan

[73] Assignee: Yugenkaisha Matsubei, Tokyo, Japan

[21] Appl. No.: 290,459

[22] Filed: Dec. 27, 1988

[51] Int. Cl.[4] ............................................. B29C 47/24
[52] U.S. Cl. .................................... 425/133.1; 99/353; 99/450.7; 264/209.2; 425/462; 426/514; 426/516
[58] Field of Search ............... 425/131.1, 133.1, 382.3, 425/382.4, 462, 463, 465; 264/209.2; 99/450.7, 353, 450.6; 426/512, 514, 516

[56] References Cited

U.S. PATENT DOCUMENTS

| | | | |
|---|---|---|---|
| 3,505,948 | 4/1970 | Carre et al. | 99/353 |
| 3,642,396 | 2/1972 | Meneidis | 425/131.1 X |
| 3,676,036 | 7/1972 | Rossi | 99/450.7 X |
| 3,716,612 | 2/1973 | Schrenk et al. | 425/131.1 X |
| 4,259,051 | 3/1981 | Shatila | 425/133.1 |
| 4,504,511 | 3/1985 | Binley | 425/382.3 X |
| 4,615,264 | 10/1986 | Rose | 99/450.7 X |
| 4,686,075 | 8/1987 | Dziewanowski et al. | 425/382.3 X |

FOREIGN PATENT DOCUMENTS

| | | | |
|---|---|---|---|
| 56-38189 | 9/1981 | Japan | 425/133.1 |
| 58-29067 | 6/1983 | Japan | 425/133.1 |

Primary Examiner—Richard L. Chiesa
Attorney, Agent, or Firm—Frishauf, Holtz, Goodman & Woodward

[57] ABSTRACT

An extruder for food, having; a rotary cylinder fitted to a tip of an extrusion nozzle for extruding a food material; at least one feed opening formed in the outer periphery of the rotary cylinder, from which a different food material is fed; a stationary cylinder so fitted as to cover the feed opening in slidable contact with the outer periphery of the rotary cylinder, and having a circular space formed around the corresponding outer periphery of the rotary cylinder; and a feed pipe from which the different food material is fed into the circular space of the stationary cylinder. This extruder enables application of a variety of patterns of a spiral, wavy or like form, with use of such a simple structure that the rotary cylinder and the stationary cylinder are fitted to the tip of a nozzle. Due to the simplicity in the structure, it is also possible to perform with ease maintenance such as cleaning.

8 Claims, 2 Drawing Sheets

EXTRUDER FOR FOOD

FIELD OF THE INVENTION

The present invention relates to an extruder for food, that can be applied in preparing, for example, fish paste products.

BACKGROUND OF THE INVENTION

In preparing fish paste products such as boiled fish paste (or kamaboko), it has been commonly practiced to shape raw fish meat paste with use of an extruder.

The extruder of this sort has been hitherto so constructed that, as illustrated in FIG. 3, a hopper 12 into which a food material is thrown is set on a pedestal 11 and the food material thrown into the hopper 12 is press-forwarded to an extruder main body 15 through a transport pipe 14 by the action of a material-feeding pump 13. Then the food material is extruded into a given shape from a nozzle 16 of the extruder main body 15, and so cut as to have a given length by means of a cutter (not shown) or the like.

However, products obtained by shaping a simple food material with use of the above extruder have been monotonous in their food texture and appearance, being unsatisfactorily a little poor in ideas. Thus, it is recently practiced to form the nozzle into a multiple pipe structure or the like so that a plurality of food materials different in the material and color can be simultaneously extruded.

As an attempt therefor, Japanese Patent Publication No. 38189/1981 or Japanese Patent Publication No. 29067/1983 propose an apparatus in which a cylindrical nozzle is formed into a multiple pipe structure (e.g., an outer-and-inner double-wall pipe structure) to form a circular (or ring-like, when viewed from the front) discharge end along its periphery, which circular discharge end is further partitioned so as to form arcs (when viewed from the front), and outer-layer materials different in colors are respectively extruded from the arclike discharge ends while the nozzle is rotated, so that a pattern can be applied to the surface in a spiral form.

The above apparatus makes it possible to apply to the surface a unique pattern composed of spiral stripes, but have had the problems that the structure of the apparatus is complicated, resulting in a high production cost and also making it difficult to perform the maintenance such as internal cleaning.

SUMMARY OF THE INVENTION

An object of the present invention is to provide an extruder for food, that can apply a spiral or like pattern on the outer periphery of the food with employment of a simple structure.

The extruder for food according to the present invention is characterized by comprising;

a rotary cylinder fitted to a tip of an extrusion nozzle for extruding a food material;

at least one feed opening formed in the outer periphery of said rotary cylinder, from which a different food material is fed;

a stationary cylinder so fitted as to cover said feed opening in slidable contact with the outer periphery of said rotary cylinder, and having a circular space formed around the corresponding outer periphery of said rotary cylinder; and a feed pipe from which said different food material is fed into said circular space of said stationary cylinder.

Hence, the food material may be extruded from the inside of the nozzle and another food material different in color may be simultaneously fed from the feed pipe of the stationary cylinder while the rotary cylinder is rotated, so that a spiral pattern having difference in colors can be applied to the outer periphery of the food. Also, the rotation of the rotary cylinder may be variously changed, so that the pattern can be applied not only in the spiral form but also in other forms such as a wavy form. Moreover, since the rotary cylinder and the stationary cylinder may only be provided to the conventional extruder as illustrated in FIG. 3, the apparatus can have a simple structure and can be worked with a low production cost, also bringing about an easiness for maintenance such as cleaning.

DESCRIPTION OF PREFERRED EMBODIMENTS

Figure 1:
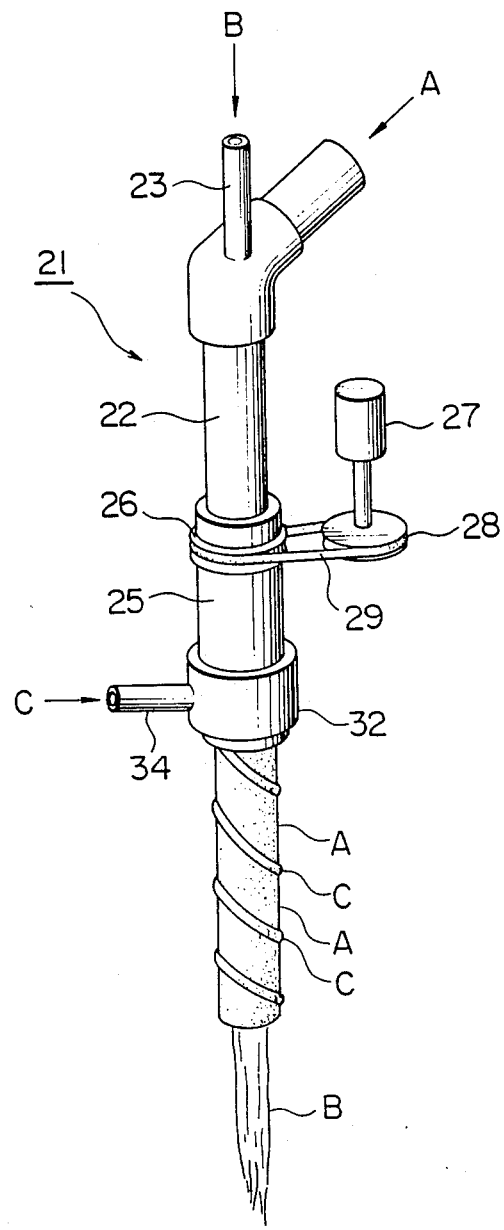
FIG. 1 is a perspective view illustrating the main part of an extruder for food according to an example of the present invention.
Figure 2:
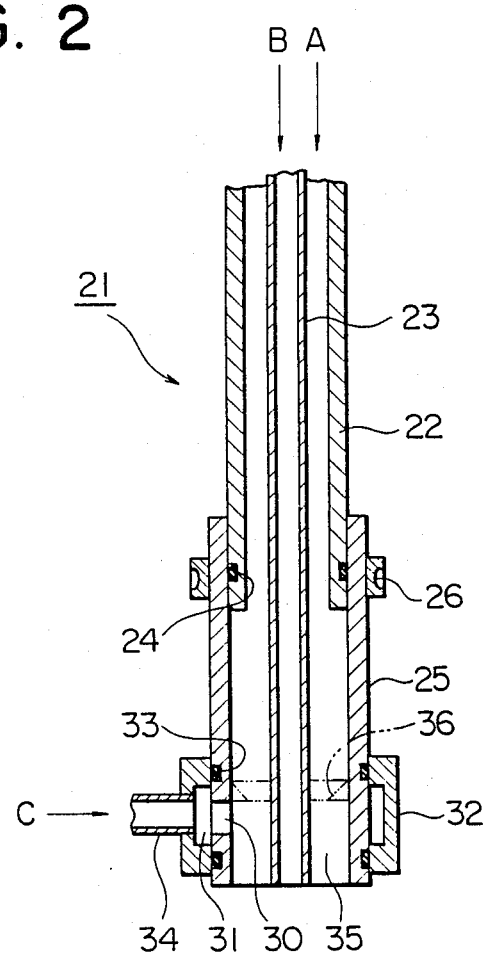
FIG. 2 is a partial cross section illustrating the main part of the same extruder.
Figure 3:
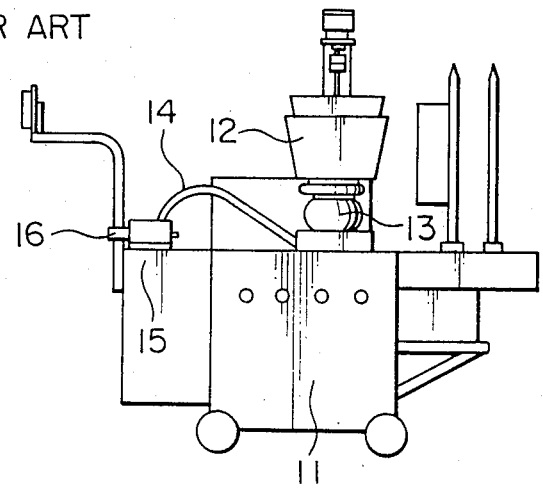
FIG. 3 is a front view schematically illustrating an example of conventional extruders for food.

FIG. 1 and FIG. 2 illustrate an example of the extruder for food according to the present invention.

This extruder 21 comprises a cylindrical nozzle 22 provided at the center thereof with a pipe 23 for feeding a fluid such as water. The cylindrical nozzle 22 is bent in an L-form at its rear portion, and the fluid-feed pipe 23 projects rearward from this bent portion. Raw fish meat paste A of white meat, for example, is fed into the cylindrical nozzle 22, and hot water B, for example, is fed into the fluid-feed pipe 23.

At the tip of the cylindrical nozzle 22, a rotary cylinder 25 is rotatably fitted via a bearing 24. A pulley 25 is formed at an outer periphery of the rotary cylinder 25, and this pulley 26 is connected via a drive belt 29 to a pulley 28 fitted to a drive shaft of a motor 27. Thus, the rotary cylinder 25 is rotated by the driving of the motor 27.

A feed opening 30 to feed, for example, raw fish meat paste C of red meat is formed at part in the rotary cylinder 25. And, on the outer periphery of the rotary cylinder 25, a stationary cylinder 32 is fitted via a bearing 33 in such a manner that a circular space 31 is formed around the rotary cylinder 25, covering the above feed opening 30. Consequently, the rotating of the rotary cylinder 25 results in rotation of the feed opening 30 along the circular space 31 of the stationary cylinder 32.

The stationary cylinder 32 is provided with a feed pipe 34 from which the raw fish meat paste C of red meat is fed into the above circular space 31. The feed opening 30 may also be provided in plurality in the outer peripheral direction, as described below more specifically.

The tip of the rotary cylinder 25 constitutes a discharge end 35, and the tip of the fluid-feed pipe 23 previously described extends to the vicinity of this discharge end 35.

The operation of the extrusion using the present extruder 12 will be described below.

First, the raw fish meat paste A of white meat is press-forwarded to the inside of the cylindrical nozzle 22. At the same time therewith, hot water B is fed into the fluid-feed pipe 23. On the other hand, the raw fish meat paste C of red meat is fed from the feed pipe 34 into the circular space 31 of the stationary cylinder 32. Simultaneously the motor 27 is driven to rotate the rotary cylinder 25 via the pulley 28, the drive belt 29 and the pulley 26.

The raw fish meat paste A of white meat is passed through the empty space between the cylindrical nozzle 22 and the fluid-feed pipe 23, shaped in the form of a tube, and extruded from the discharge end 35 of the rotary cylinder 25. In this instance, the product shaped in the form of a tube is heated by the hot water B flowing through the inside of the fluid-feed pipe 23 and its inner wall is solidified to a certain degree, so that the inner wall is free from being stuck to the pipe, thus enabling the product to retain the tubular shape. The hot water B is, after the shaped product has been extruded, passed through the inside of the product, and flowed out from the tip (appropriately cut end surface) of the shaped product.

On the other hand, the raw fish meat paste C of red meat is passed through the feed pipe 34 of the stationary cylinder 32, fed into the circular space 31, pressed in from the feed opening formed in the outer periphery of the stationary cylinder 32, and adhered on the outer periphery of the raw fish meat paste A of white meat. Here, since the rotary cylinder 25 is rotated by means of the motor 27, the position of the feed opening 30 is also rotated, so that the raw fish meat paste C of red meat is adhered on the outer periphery of the raw fish meat paste A of white meat in the form of spiral stripes.

In this way, there can be obtained a shaped product having the form of a tube as a whole, comprising the raw fish meat paste C of red meat adhered in a spiral form on the raw fish meat paste A of white meat. The shaped product having been extruded from the discharge end 35 of the rotary cylinder 25 is optionally cut to a suitable length with a cutter (not shown), and immersed in hot water or the like until the whole thereof is solidified by heating. The heating may be effected by steaming, microwaves, oil-flying, or the like. When the oil-flying is employed, it is preferred to use a heated oil as the fluid fed into the fluid-feed pipe 23.

Incidentally, in the above extruder, the rotary cylinder 25 may be swung so as to be changed in its rotational direction at a given angle, so that the raw fish meat paste C of red meat can be made to form a pattern of waves. Besides, the manner of rotating the rotary cylinder 25 may also be changed, so that the pattern can be formed in various forms.

In another embodiment of the above example, two or more feed openings 30 may be provided in the same outer peripheral direction, in the case of which the raw fish meat paste C of red meat is fed from each feed opening 30, thus enabling formation of parallel stripes in a spiral, wavy or like form. In still another embodiment, two or more feed openings 30 may be provided separated from each other in the axial direction and the stationary cylinder 32 may be fitted in a plural number corresponding to the respective feed openings 30. In this instance, the color of the food material fed in each stationary cylinder 32 may be made different, so that a shaped product having a pattern with a plurality of colors can be obtained. These two embodiments may also be combined.

In the above example, the fluid-feed pipe 23 is provided through the cylindrical nozzle 22, but this fluid-feed pipe 23 may be omitted. In such an instance, it follows that the raw fish meat paste A of white meat fed into the cylindrical nozzle 22 is formed in the shape of a column. In this instance, the cylindrical nozzle 22 may comprise a double-cylinder nozzle so that a different raw fish meat paste is fed into its central part.

It is further possible to change the pressure used to feed the raw fish meat paste C of red meat into the circular space 31 formed between the stationary cylinder 32 and rotary cylinder 25 and give a variety to the pressure of extrusion from the feed opening 30, thereby giving a variety to the thickness of the pattern applied by the raw fish meat paste C of red meat.

In a further embodiment, as illustrated with imaginary lines in FIG. 2, and inward projected ring 36 may be provided on the inner periphery of the rotary cylinder 25 and at the part upstream to the feed opening 30. This ring 36 can facilitate the raw fish meat paste C of red meet to be fed from the feed opening 30 onto the outer periphery of the raw fish meat paste A of white meat.

It is also possible to cover the part corresponding to the discharge end 35 with a casing made of an edible film so that the extruded food material can be packed in the casing.

As described in the above, the present invention makes it possible to apply a variety of patterns of a spiral, wavy or like form, with use of such a simple structure that the rotary cylinder and the stationary cylinder are fitted to the tip of the nozzle. Because of simplicity in the structure, it is also possible to perform with ease maintenance such as cleaning.

What is claimed is:

1. An extruder for food, comprising:
   a rotary cylinder fitted to a tip of an extrusion nozzle for extruding a food material;
   at least one feed opening formed in the outer periphery of said rotary cylinder, from which a different food material is fed;
   a stationary cylinder so fitted as to cover said feed opening in slidable contact with the outer periphery of said rotary cylinder, and having a circular space formed around the corresponding outer periphery of said rotary cylinder; and
   a feed pipe from which said different food material is fed into said circular space of said stationary cylinder.

2. The extruder for food according to claim 1, wherein said rotary cylinder is connected to a rotating means.

3. The extruder for food according to claim 1, wherein said feed opening comprises two or more openings provided in the same outer peripheral direction.

4. The extruder for food according to claim 1, wherein said feed opening comprises two or more feed openings separated from each other in the axial direction, and said stationary cylinder is fitted in a plural number corresponding to the respective feed openings.

5. The extruder for food according to claim 1, wherein a fluid-feed pipe is provided through a cylindrical nozzle comprising said extrusion nozzle.

6. The extruder for food according to claim 5, wherein a tip of the rotary cylinder comprises a discharge end, and a tip of said fluid-feed pipe extends to the vicinity of said discharge end.

7. The extruder for food according to claim 1, wherein a cylindrical nozzle comprising said extrusion nozzle comprises a double-cylinder nozzle.

8. The extruder for food according to claim 1, wherein an inward projected ring is provided on the inner periphery of said rotary cylinder and upstream of said feed opening of the stationary cylinder.

* * * * *